US007097230B2

(12) United States Patent
Ishihara et al.

(10) Patent No.: US 7,097,230 B2
(45) Date of Patent: Aug. 29, 2006

(54) POWER ACTUATOR SYSTEM FOR ACTUATING A CLOSURE MEMBER

(75) Inventors: Kazunori Ishihara, Kiryu (JP); Takao Ochiai, Kiryu (JP); Junichi Busujima, Kiryu (JP); Tatsuya Kaneko, Kiryu (JP); Yoshinori Miyake, Wako (JP); Tomofumi Ichinose, Wako (JP); Kenichi Munenaga, Wako (JP)

(73) Assignees: Mitsuba Corporation, Kiryu (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/245,283

(22) Filed: Oct. 6, 2005

(65) Prior Publication Data

US 2006/0071504 A1 Apr. 6, 2006

(30) Foreign Application Priority Data

Oct. 6, 2004 (JP) ............................ 2004-293660

(51) Int. Cl.
*B62D 25/10* (2006.01)
*B60J 5/00* (2006.01)

(52) U.S. Cl. ...................................... 296/146.4; 296/76

(58) Field of Classification Search ............... 296/37.1, 296/56, 146.4, 76; 49/339, 341, 340
See application file for complete search history.

(56) References Cited

U.S. PATENT DOCUMENTS

| | | | | |
|---|---|---|---|---|
| 6,601,903 | B1 | 8/2003 | Nakagome | |
| 2002/0180233 | A1* | 12/2002 | Benthaus et al. | 296/76 |
| 2004/0046418 | A1* | 3/2004 | Chikata et al. | 296/146.4 |
| 2005/0127711 | A1* | 6/2005 | Rigorth et al. | 296/146.4 |

FOREIGN PATENT DOCUMENTS

| | | |
|---|---|---|
| JP | 2002-180738 | 6/2002 |

* cited by examiner

*Primary Examiner*—Jason Morrow
(74) *Attorney, Agent, or Firm*—Carrier Blackman & Associates, P.C.; William D. Blackman; Joseph P. Carrier

(57) ABSTRACT

Provided is a power actuator system for actuating a closure member (1) such as a trunk lid which is compact in size and has a minimized protrusion. A first link (8) is connected to an output shaft of a powered actuator (7), and a free end of the first link is connected to an end of a second link (9). The other end of the second link is pivotally connected to a hinge arm (4) which is fixedly attached to a closure member and pivotally supports the closure member to a fixed part such as a vehicle body. The first link is adapted to extend substantially from the output shaft towards the closure member as the first link swing around the output shaft, and the second link extends substantially perpendicularly with respect to the center line.

18 Claims, 10 Drawing Sheets

POWER ACTUATOR SYSTEM FOR ACTUATING A CLOSURE MEMBER

TECHNICAL FIELD

The present invention relates to a power actuator system for actuating a closure member such as a trunk lid.

BACKGROUND OF THE INVENTION

It is known to actuate a closure member such as a trunk lid by using a power actuator. See Japanese patent laid open publication No. 2002-180738. Such a power actuator system typically comprises an electric motor, a reduction gear unit and a link mechanism. The base end of a first link is fixedly attached to the output shaft of the reduction gear unit, and the free end of the link is connected to the base end of a second link. The free end of the second link is connected to a hinge arm which is in turn fixedly attached to a hinge end of the trunk lid. A damper that resiliently urges the trunk lid in the opening direction is connected between the hinge arm and a part of the vehicle body. By turning the output shaft in each direction, the trunk lid can be opened and closed at will.

In such an arrangement, the load acting upon the power actuator is primarily dictated by the weight of the trunk lid and the thrust of the damper, and varies significantly depending on the angular position of the trunk lid. When the trunk lid is fully closed and is substantially horizontal, although the damper produces a maximum force, the weight of the trunk lid is so dominant that a relatively large torque is required for the actuator to raise the trunk lid from the fully closed position. As the opening angle of the trunk lid increases, the effect of the weight diminishes while the thrust of the damper in the direction to open the trunk lid becomes more pronounced so that a relatively small torque is required for the actuator to further open the trunk lid.

Conversely, when closing the trunk lid from the fully open state, the thrust of the damper is at a minimum value and the load of the weight of the trunk lid acting in the closing direction is also at a minimum because the trunk lid is at a substantially upright position so that the actuator is only required to overcome the small thrust of the damper. As the trunk lid 1 moves away from the fully closed position, the load acting in the closing direction progressively increases, and a relatively small torque is required to close the trunk lid. When the trunk lid is about to be fully closed, the thrust of the damper acting in the open direction is at a maximum and the reaction force of the weather strip is required to be overcome. Therefore, a substantial torque is required for the actuator to fully close the trunk lid and engages the latch against the resistance of the weather strip.

In such a conventional actuator for a trunk lid, the thrust of the damper is selected in such a manner that the power actuator is required only when moving the trunk lid from the fully closed state to a slightly open state, and the damper provides a force required to move the trunk lid from the slightly open state to the fully open state. Thereby, the torque requirement of the power actuator is minimized, and the power actuator may be designed as a highly compact unit. However, in such an arrangement, it is necessary to adjust the torque output of the power actuator depending on the opening angle of the trunk lid, and this requires a highly complex control arrangement. In particular, it is necessary to provide an angle sensor for detecting the opening angle of the power actuator, and this increases the cost.

When the trunk lid is to be actuated by a power actuator from the fully closed state to the fully open state, no complex control is required, but the power actuator is required to have a relatively large output and this undesirably increases the size of the power actuator. Because the power actuator of this type is required be installed in the limited space of the trunk, the power actuator is required to be as small as possible and any protrusion into the trunk room is desired to be minimized.

BRIEF SUMMARY OF THE INVENTION

In view of such problems of the prior art, a primary object of the present invention is to provide a power actuator system for actuating a closure member such as a trunk lid which is compact in size and has a minimized protrusion.

A second object of the present invention is to provide a power actuator system which has a torque/speed property of a desirable pattern.

A third object of the present invention is to provide a power actuator system which is simple in structure and economical to manufacture.

According to the present invention, at least some of these objects can be accomplished by providing an actuator system for actuating a closure member mounted on a vehicle body via a hinge, comprising: a hinge arm fixedly attached to the closure member at one end and pivotally attached to the vehicle body at a hinge point; a power actuator mounted on the vehicle body and having an output shaft extending substantially in parallel with a pivot axis of the hinge; a first link having a base end fixedly attached to the output shaft; a second link having a base end pivotally connected to a free end of the first link and a free end pivotally attached to the hinge arm; the first link being adapted to extend substantially from the output shaft towards the closure member as the first link swings around the output shaft.

Thereby, the power actuator can be placed close to the closure member at a distance substantially equal to the length of the first link, and there is no protrusion on the side of the power actuator facing away from the closure member. Therefore, the available space within the closure member can be maximized. In particular, if the second link is disposed in such a manner that the closure member turns in an opposite direction from a rotational direction of the output shaft, the link mechanism can be most simplified. Typically, the closure member is fitted with a damper that normally urges the closure member toward the fully open state.

According to the present invention, a particularly favorable link efficiency or a torque/speed property can be achieved if the second link extends substantially perpendicularly to a line extending from the output shaft toward the closure member. Preferably, a first angle defined between the second link and the hinge arm is smaller than 180 degrees and a second angle defined between the first link and second link is smaller than 180 degrees change in mutually opposite senses as the output shaft turns in each direction. Typically, the first angle and second angles are each in a range of 30 to 150 degrees.

The second link may be disposed in such a manner that a movement of the free end of the first link is transmitted to the hinge arm either via a tensile force applied to the second link or via a compressive force applied to the second link. Depending on the particular geometry of the closure member and the surrounding structure, either one of these two possible arrangements can be selected.

According to a preferred embodiment of the present invention, the output shaft of the power actuator is placed adjacent to a hinge end of the closure member so that the power actuator system may be formed as a highly compact unit. Also, the hinge arm may include an arcuate portion having a first end fixedly attached to the closure member and a radial arm extending from the other end of the arcuate portion toward the closure member. This invention is particularly suitable for use in a powered automotive trunk. In such case, the part of the closure member adjacent to the hinge extends substantially horizontally.

BRIEF DESCRIPTION OF THE DRAWINGS

Now the present invention is described in the following with reference to the appended drawings, in which.

DETAILED DESCRIPTION OF THE PREFERRED EMBODIMENT(S)

Figure 1:
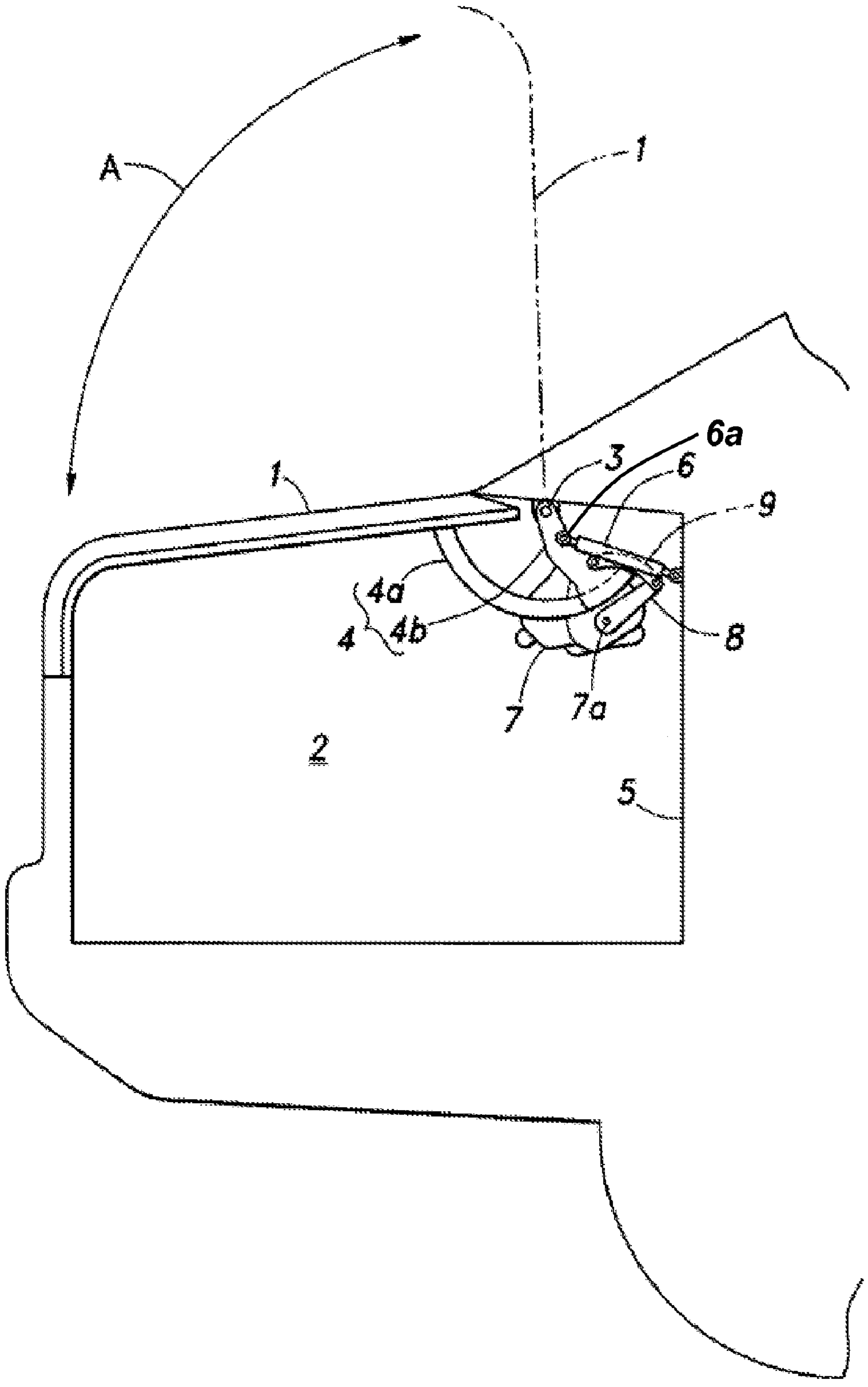
FIG. 1 is a simplified partly broken away side view of an arrangement for automatically opening and closing an automotive trunk lid embodying the present invention.

FIG. 1 is a simplified partly broken away side view of a trunk section of a vehicle provided in a rear end thereof. A trunk lid 1 includes a main part which is substantially horizontal in its closed state and a rear part which curves downward from the rear end of the main part. The inner surface of the front part of the trunk lid is provided with a pair of hinge arms 4 at either side end thereof. Each hinge arm 4 includes an arcuate main part 4*a* extending over an angle of about 90 degrees having a first end fixedly attached to the front end of the trunk lid, a radial arm 4*b* extending substantially radially inwardly from a second end (or front end) of the main part 4*a* and having an inner end pivotally supported by a lid pivot shaft 3 extending laterally in a part of the vehicle body 5 adjacent to the front edge of the trunk opening. To an intermediate point of the radial arm 4*b* of the hinge arm 4 is pivotally connected a free end of a piston rod 6*a* of a pneumatic damper 6. The other end of the damper 6 is pivotally connected a part of the vehicle body 5.

Figure 2:
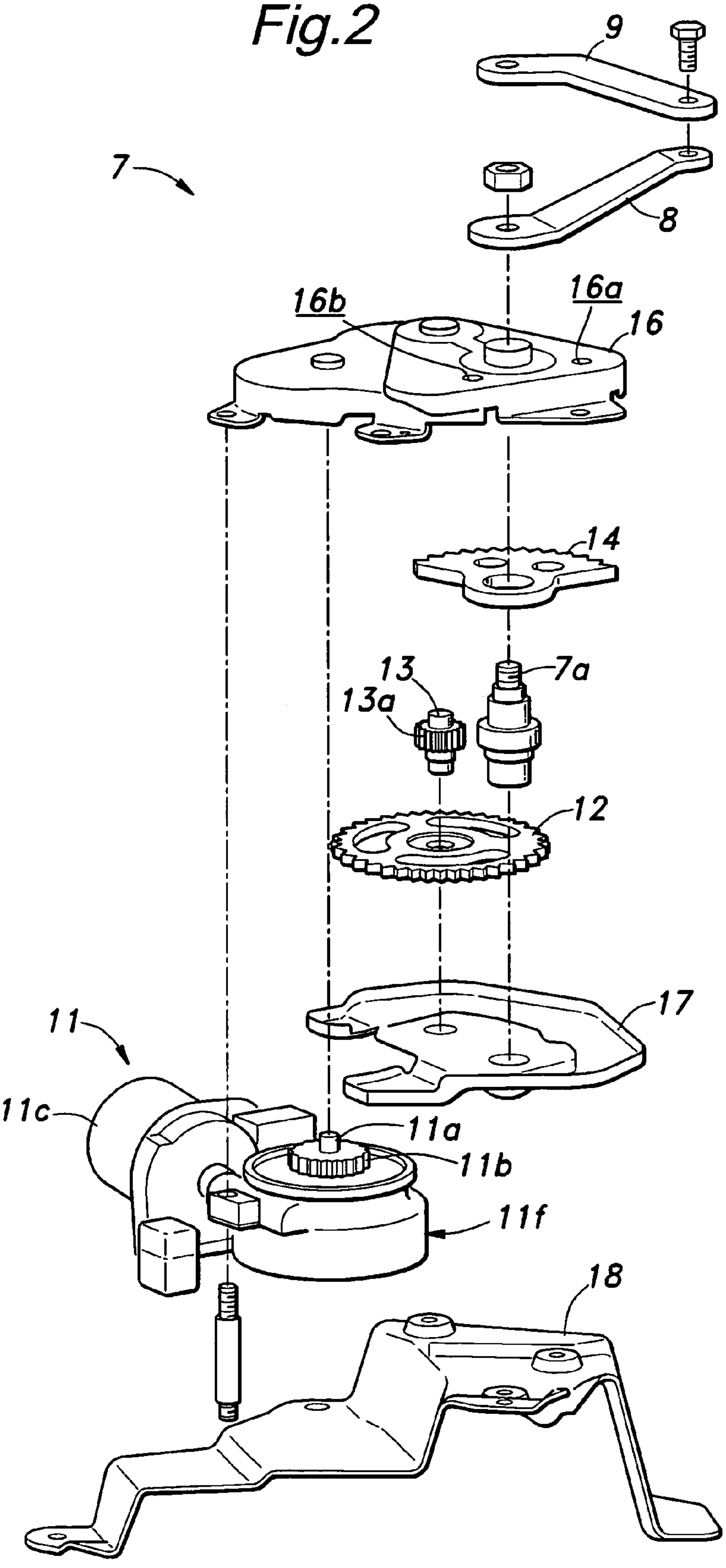
FIG. 2 is an exploded perspective view of an essential part of the power actuator system according to the present invention.

A power actuator 7 is mounted on a suitable part of the vehicle body 5 via a bracket 18 (FIG. 2). To an output shaft 7*a* of the actuator 7 is fixedly attached a base end of a first link 8, and the free end of the first link 8 is pivotally connected to a base end of a second link 9, and the free end of the second link 9 is pivotally connected to an intermediate point of the radial arm 4*b* of the hinge arm 4. The angular movement of the output shaft 7*a* is transmitted to the radial arm 4*b* via the first and second links 8 and 9 in such a manner that the trunk lid 1 can move over an angular range indicated by A in FIG. 1 as the output shaft 7*a* turns over a prescribed angular stroke.

Referring to FIG. 2, the actuator 7 includes an electric motor unit 11 mounted on the vehicle body 5 via the bracket 18 and a gear reduction unit. The gear reduction unit includes an actuator housing consisting of upper and lower housing halves 16 and 17, a small gear 11*b* fixedly attached to a drive shaft 11*a* of the motor unit 11, a large gear 12 rotatably supported by the actuator housing and meshing with the small gear 11*b*, a pinion 13*a* fixedly attached to a central shaft 13 of the large gear 12 and a sector gear 14 rotatably supported by the actuator housing and meshing with the pinion 13*a*. The output shaft 7*a* of the actuator 7 is fixedly attached to a rotational center of the sector gear 14.

The central shaft 13 of the large gear 12 and output shaft 7*a* are rotatably supported by the actuator housing via bearing members not shown in the drawings. An end of the output shaft 7*a* projects out of the upper housing half 16, and the base end of the first link 8 is fixed attached to the projecting end of the output shaft 7*a* as mentioned earlier by using a threaded nut or the like. The motor unit 1 and actuating housing are jointly attached to the vehicle body 5 via the bracket 18 as discussed earlier.

Figure 3:
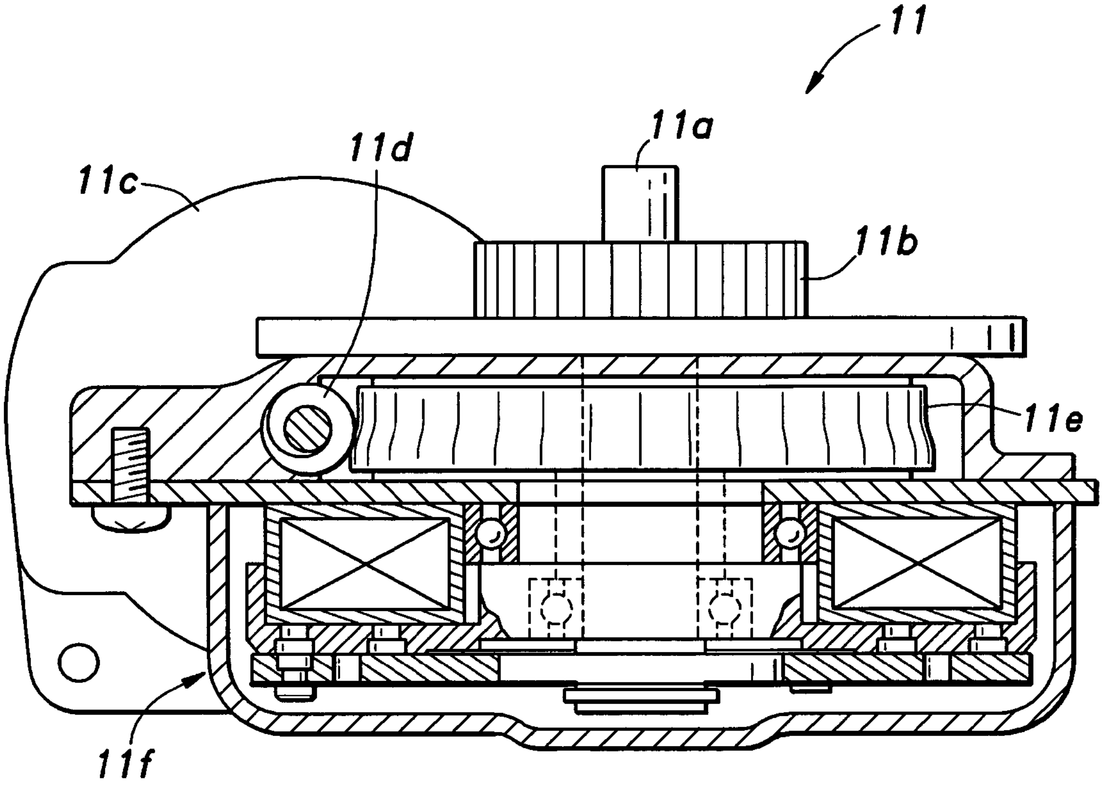
FIG. 3 is a sectional view of a motor unit and a gear reduction unit.

Referring to FIG. 3, the electric motor unit 11 includes a DC electric motor 11*c*, a worm 11*d* fixedly attached to the output shaft of the motor 11*c*, a wheel gear 11*e* meshing with the worm 11*d* and an electromagnetic clutch 11*f* interposed between the wheel gear 11*e* and drive shaft 11*a* of the motor unit 11. The motor 11*c* can turn in either direction according to a signal from a control unit not shown in the drawing, and the electromagnetic clutch 11*f* allows selectively transmission of power from the wheel gear 11*e* to the drive shaft 11*a*. The motor 11*c* consists of a DC motor in this case, but may also consist of a motor of different types, such as a brushless motor.

When this actuator 7 is activated, the output shaft 7*a* turns in a selected direction, and the first link 8 also turns around the output shaft 7*a*. The angular movement of the first link 8 is transmitted to the hinge arm 4 via the second link 8, and this causes the trunk lid 1 to move between a fully closed position and fully open position. This can be effected by counting the pulses of a rotary encoder (not shown in the drawing) incorporated in the actuator or the pulses that are supplied to the electric motor 11*c*. When the trunk lid 1 has reached the fully closed position or fully open position, the power actuator is deactivated.

When the trunk lid 1 is actuated by the power actuator 7, the electromagnetic clutch 11*f* is kept engaged. Therefore, the trunk lid can be held in any desired position between the fully open position and fully closed position without regard to the load, such as the weight of the trunk lid 1, that is applied to the actuator owing to the mechanically irreversible arrangement formed by the worm gear mechanism.

When it is desired to allow the trunk lid 1 to be opened and closed manually, the electromagnetic clutch 11*f* is disengaged so that the mechanically irreversible arrangement may be disconnected from the trunk lid 1.

When the trunk lid 1 is actuated either manually or automatically, it is necessary to prevent the trunk lid 1 from being forced beyond the fully closed position or fully open position as it would cause undue stressing of various parts. A mechanical stopper arrangement is provided in the illustrated embodiment for this purpose.

Figure 4A:
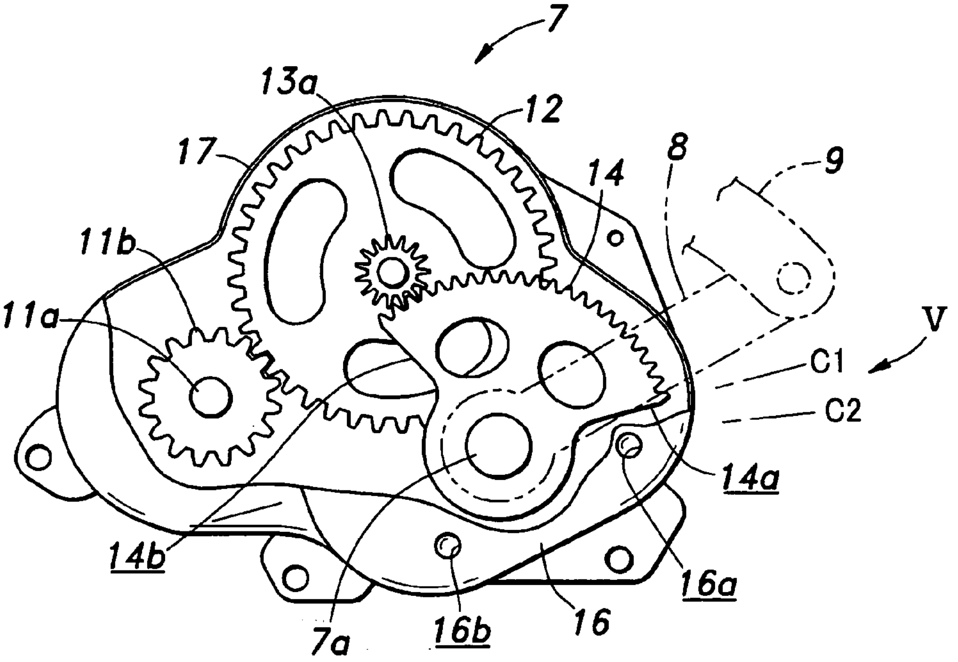
FIG. 4*a* is a partly broken away plan view of the gear reduction unit in the fully closed state of the trunk lid.
Figure 4B:
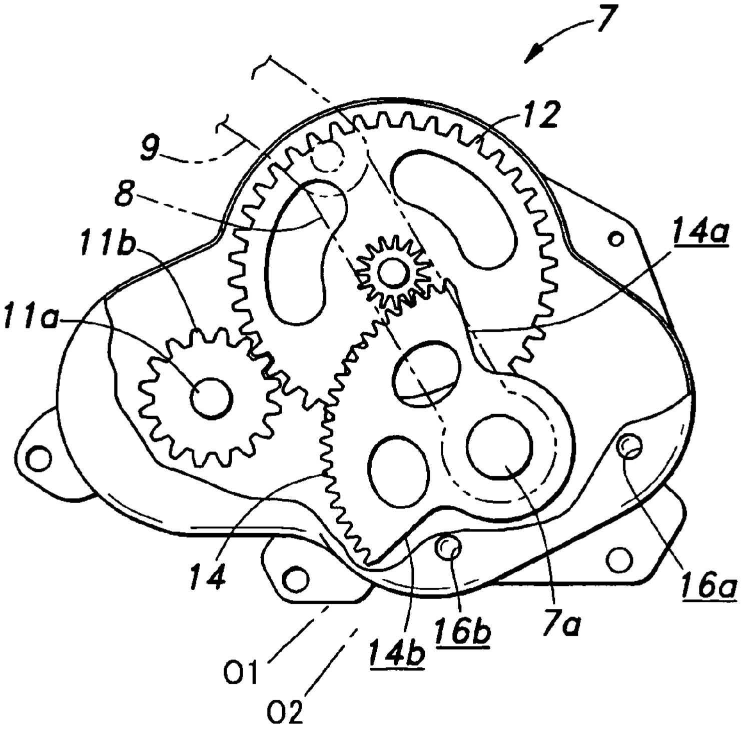
FIG. 4*b* is a view similar to FIG. 4*a* in the fully open state of the trunk lid.

Referring to FIG. 4*a*, the upper housing half 16 is formed with a first projection 16*a* at such a position that the sector gear 14 abuts the projection 16*a* if it turns beyond the fully closed position (indicated by C1), and a second projection 16*b* at such a position that the sector gear 14 abuts the projection 16*b* if it turns beyond the fully open position (indicated by O1 in FIG. 4*b*). Each of these projections 16*a* and 16*b* may be formed at the time of stamp forming the upper housing half 16.

Figure 5A:
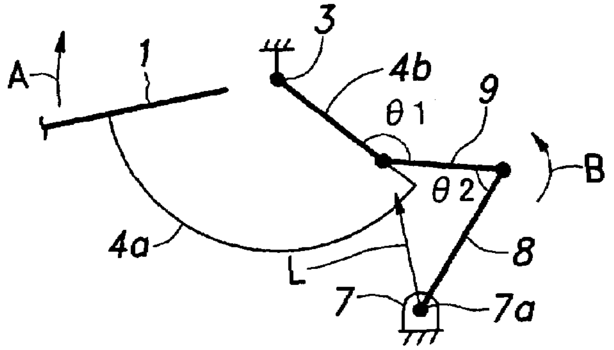
FIG. 5*a* is a skeleton diagram of the link mechanism according to the present invention in the fully closed state of the trunk lid.

The mode of operation of this system is now described in the following with reference to FIGS. 5*a* to 5*d*. FIG. 5*a* shows the fully closed state of the trunk lid 1 in which the angle θ1 defined between the radial arm 4*b* of the hinge arm 4 and second link 9 or the first angle is 146 degrees and the angle θ2 defined between the first link 8 and second link 9 or the second angle is 52 degrees. These angles θ1 and θ2 are not limited to these values, but may be selected appropriately in consideration of the link efficiency when actuating the trunk lid 1.

The link efficiency as used herein means a relationship between the torque that is required to actuate the trunk lid 1 or the radial arm 4*a* of the hinge arm 4 and the rotational speed thereof. A link efficiency greater than 100% means a case in which the torque is greater than the standard value and the rotational speed is smaller than the standard value. Conversely, a link efficiency less than 100% means a case in which the torque is smaller than the standard value and the rotational speed is greater than the standard value.

The load of the weight of the trunk lid 1 is greatest when the trunk lid 1 is about to be opened from the fully closed state although the damper 6 provides a greatest thrust. Therefore, a largest torque is required to actuate the trunk lid 1 at such a time. The thrust of the damper 6 cannot be made greater than a certain level because it would excessively oppose the effort to close the trunk lid 1. As a result, the torque required to open the trunk lid from the fully closed state is relatively great but a substantially less torque is required to move the trunk lid from a partly open state to a fully open state. Therefore, when designing an automotive powered trunk lid, it is desirable to set the link efficiency relatively great when the trunk lid 1 is near the fully closed state and relatively small when the trunk lid 1 is away from the fully closed state. Therefore, an adequate torque output is ensured when opening the trunk lid 1 from the fully closed state, and a rapid movement of the trunk lid 1 is achieved when it moves from a partly open state to a fully open state.

Referring to FIG. 5*a*, if the second angle θ2 formed between the first and second links 8 and 9 is too small (near zero) or too great (near 180 degrees) when opening the trunk lid from the fully closed state, a relatively large component of the force produced by the first link 8 is transmitted to the second link 9 while the displacement of the second link 9 for a given angular movement of the first link 8 is relatively small, as the first link 8 turns in the direction indicated by arrow B and the free end of the first link 8 pushes the second link 9. If the fist angle θ1 formed between the radial arm 4*b* and second link 9 great (near 180 degrees) when opening the trunk lid from the fully closed state, a relatively small component of the force produced by the second link 9 is transmitted to the radial arm 4*b* while the displacement of the second link 9 for a given angular movement of the first link 8 is relatively large, as the free end of the second link 9 pushes the radial arm 4*a*.

Based on such considerations, it can be concluded that the torque required to open the trunk lid 1 can be minimized while an amplification factor of displacement is maximized when the angles θ1 and θ2 are near 90 degrees and 0 or 180 degrees, respectively. This is not desirable because the rotational speed of the motor has to be increased for moving the trunk lid 1 at a given speed and this tends to increase the emission of sounds and vibrations. It was experimentally verified by the inventors that the trunk lid 1 can be manually actuated from the side of the trunk lid 1 if the angles θ1 and θ2 are each selected in the range of 30 to 150 degrees provided that an irreversible mechanism such as a worm mechanism is not intervening.

When the angles θ1 and θ2 are each selected in the range of 30 to 150 degrees, the maximum torque advantage (link efficiency greater than 100%) occurs when θ1=90 degrees and θ2=30 or 150 degrees, and the maximum displacement advantage (link efficiency less than 100%) occurs when θ1=30 or 150 degrees and θ2=90 degrees. In the illustrated embodiment, as the angles θ1 and θ2 are indeed each selected in the range of 30 to 150 degrees, a maximum torque can be transmitted near the fully closed state and a maximum speed can be achieved in a partly open state.

Figure 5B:
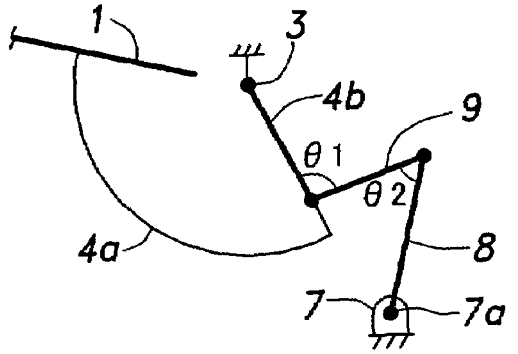
FIG. 5*b* is a view similar to FIG. 5*a* when the opening angle of the trunk lid is 25 degrees.
Figure 5C:
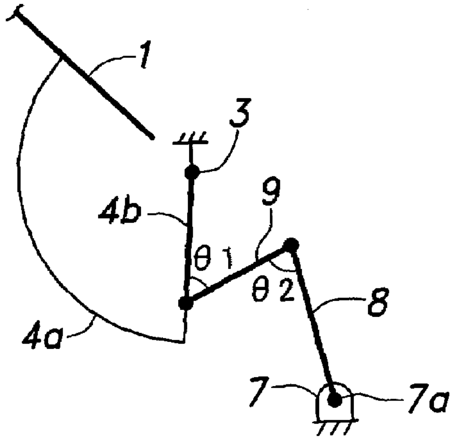
FIG. 5*c* is a view similar to FIG. 5*a* when the opening angle of the trunk lid is 50 degrees.
Figure 5D:
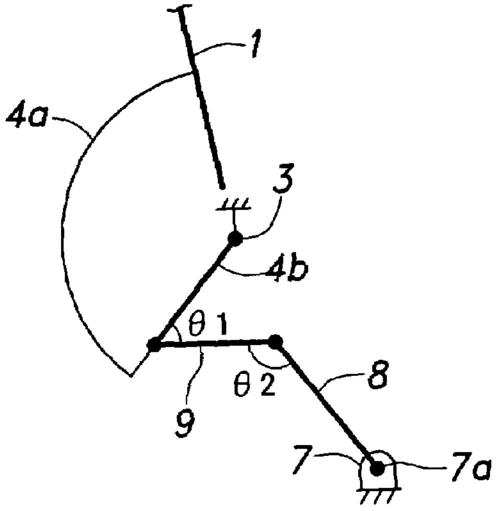
FIG. 5*d* is a view similar to FIG. 5*a* in the fully open state of the trunk lid.

In the state shown in FIG. 5*b* or when the opening angle of the trunk lid 1 is about 25 degrees, θ2 is at a minimum angle of 49 degrees and θ1 is 91 degrees in the illustrated embodiment. In the state shown in FIG. 5*c* or when the opening angle of the trunk lid 1 is 50 degrees, θ2 is 76 degrees and θ1 is 61 degrees. In the state shown in FIG. 5*d* or fully open (upright) state of the trunk lid 1, θ2 is at a maximum angle of 127 degrees and θ1 is at a minimum angle of 52 degrees. When θ2 is at a maximum angle of 127 degrees, the trunk lid 1 has turned by 146 degrees from the fully closed state.

Thus, in the illustrated embodiment, the first link 8 is adapted to extend substantially from the output shaft 7*a* towards the closure member 1 as the first link 8 swing around the output shaft 7*a*. This direction from the output shaft 7*a* toward the closure member 1 is indicated in FIG. 5*b* by L. This direction L may extend substantially perpendicularly to the major plane of the closure member near the hinge end thereof.

Figure 6A:
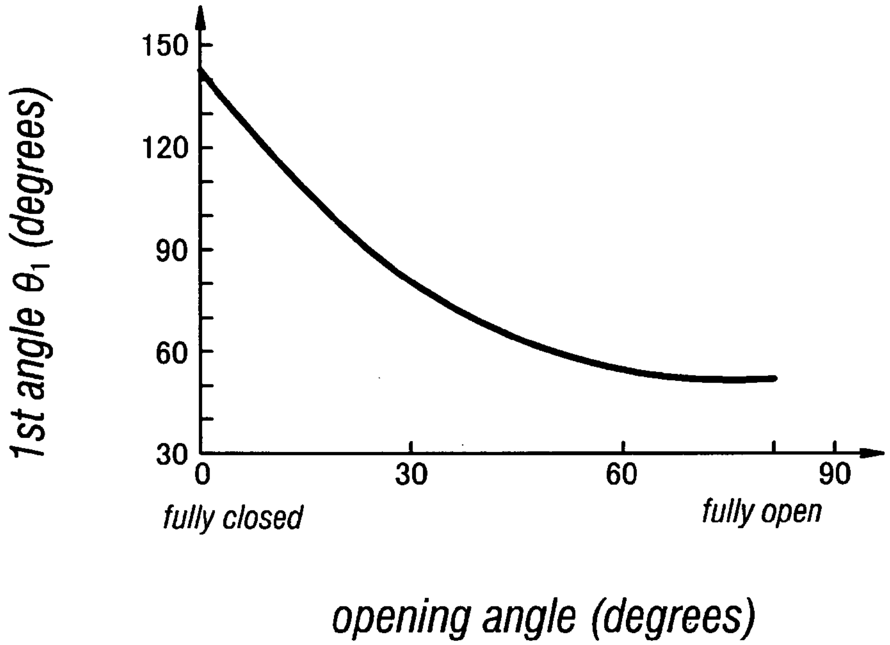
FIG. 6*a* is a graph showing the change in the first angle θ1 in relation with the opening angle of the trunk lid.
Figure 6B:
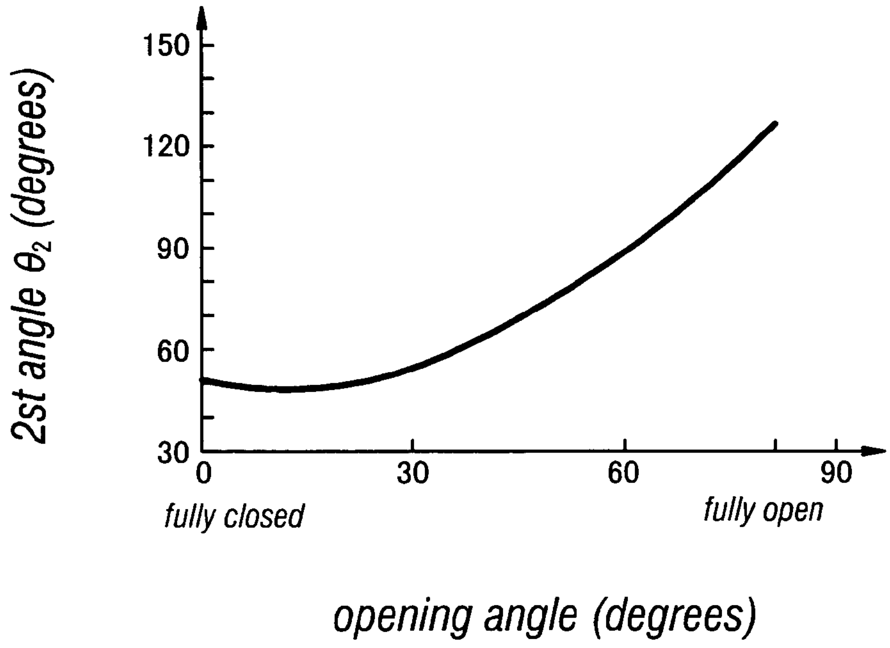
FIG. 6*b* is a graph showing the change in the second angle θ2 in relation with the opening angle of the trunk lid.

FIG. 6*a* shows the change of the first angle θ1 in relation with the opening angle of the trunk lid 1, and FIG. 6*b* shows the change of the second angle θ2 in relation with the opening angle of the trunk lid 1. As can be seen from these graphs, these angles θ1 and θ2 remain within the range of 30 to 150 degrees, and this keeps the link efficiency with an acceptable range.

Figure 7:
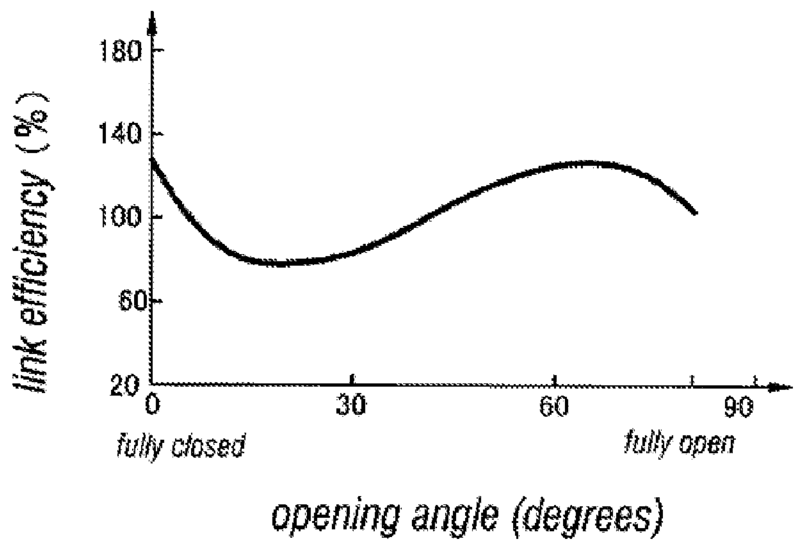
FIG. 7 is a graph showing the change in the link efficiency in relation with the opening angle of the trunk lid.

FIG. 7 shows the change in the link efficiency in relation with the opening angle of the trunk lid 1. The actuator 7 is typically required to be installed inside the car trunk, and there is a severe restriction on the lengths of the first and second links 8 and 9 and the radial arm 4*b* and how they are angularly disposed relative to one another. The illustrated embodiment is designed to optimize the torque requirement and speed of the angular movement of the trunk lid 1. In the illustrated embodiment, a progressively smaller torque is produced and a progressively higher speed is achieved as the car trunk moves from the fully closed state to a partly open state (approximately 25 degrees) of the trunk lid 1. As the trunk lid 1 moves from the 25-degree open state to a 60-degree open state, a progressively larger torque is produced and a progressively lower speed is achieved . As the trunk lid moves from the 60-degree open position to the fully open position, a progressively smaller torque is produced and a progressively higher speed is achieved. Therefore, the trunk lid can be opened from the fully closed state by using a relatively large torque so as to overcome the weight of the trunk lid, and the trunk lid 1 is moved at a relatively high speed as it moves away from the fully closed state. As the trunk lid approaches the fully open state, the speed of the trunk lid diminishes and the fully open state of the trunk lid can be achieved substantially without involving any impact. When closing the trunk lid 1 from the fully open state, the foregoing process is reversed. In particular, the trunk lid can be fully closed substantially without any impact owing to the slow speed of the trunk lid near the fully closed state and with an adequate torque that is required to engage the latch and overcome the weather strip of the trunk lid. This is a highly desirable property of a powered trunk lid.

The first link 8 which is connected to the output shaft 7*a* of the actuator 7 is adapted to be swing rearward from a slightly forwardly tilted position to a slightly rearwardly tilted position substantially symmetrically about a substantially vertical center line as the trunk lid 1 moves from a fully closed state to a fully open state. In other words, the first link 8 swings above the output shaft 7*a* and moves like an inverted pendulum. Also, the direction of the angular movement of the first link 8 is opposite to that of the trunk lid 1 around the hinge shaft 3. According to this arrangement, as compared with the conventional arrangement in which the first link swings like a normal pendulum, the first link 8 is prevented from projecting into the interior of the trunk and reducing the available trunk space.

The second link 9 is connected between the first link 8 and radial arm 4*b* so as to be disposed substantially horizontally in both the fully closed state and fully open state of the trunk lid 1. The spacing between the output shaft 7*a* and trunk lid 1 is required to be at least as great as the length of the first link 8. In the illustrated embodiment, when the first link 8 is at the fully upright position, the point of pivotal connection between the second link 9 and the radial arm 4*a* is lower than the free end of the first link 8 at which the based end of the second link 9 is pivotally connected to the first link 8 or, in the other words, the second link 9 extends downward from the point of pivotal connection thereof with the first link 8. Therefore, the spacing between the output shaft of the motor and the trunk lid is not required to be any more than the length of the first link 8. This allows the actuator 7 to be placed closer to the trunk lid 1 than is otherwise possible, and maximizes the available trunk space.

In the conventional arrangement in which the output member (first link) attached to the output shaft of the actuator is made to swing under or below the output shaft (in the manner of a normal pendulum), the output member swings in the same direction as the trunk lid 1, and this simplifies the design of the link mechanism. Having the output member swing in the opposite direction to the trunk lid 1 complicates the design of the linkage mechanism, and this fact has conventionally prevented a successful linkage design. However, the link design proposed in the present application allows the link efficiency to be optimized and the space requirement to be minimized.

Figure 8:
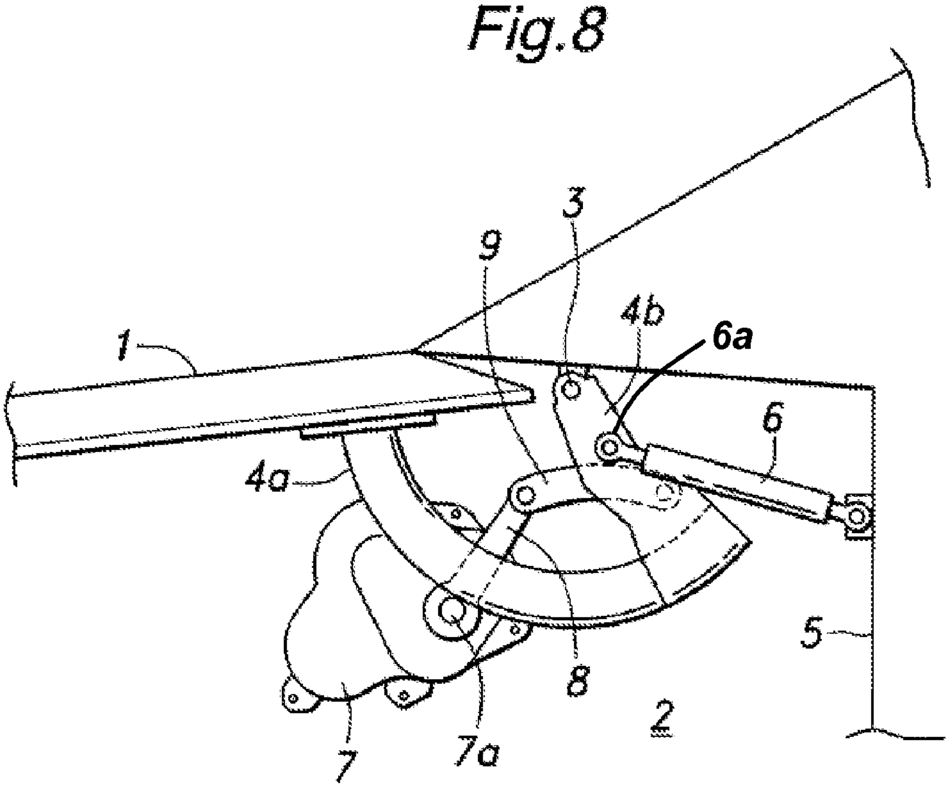
FIG. 8 is fragmentary side view of a second embodiment of the present invention.

The present invention is not limited to the foregoing embodiment, and FIGS. 8 and 9 show a second embodiment of the present invention. In FIG. 8 which is similar to FIG. 1 but is somewhat enlarged, the parts corresponding to those of the previous embodiment are denoted with like numerals without repeating the description of such parts. FIG. 9 is similar to FIG. 5, and shows the various stages of opening the trunk lid 1.

Figure 9A:
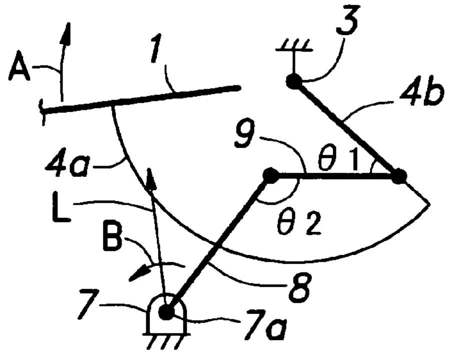
FIG. 9*a* is a skeleton diagram of the link mechanism of the second embodiment in the fully closed state of the trunk lid.
Figure 9B:
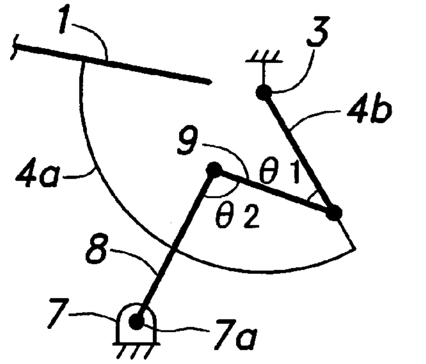
FIG. 9*b* is a view similar to FIG. 9*a* when the opening angle of the trunk lid is 15 degrees.
Figure 9C:
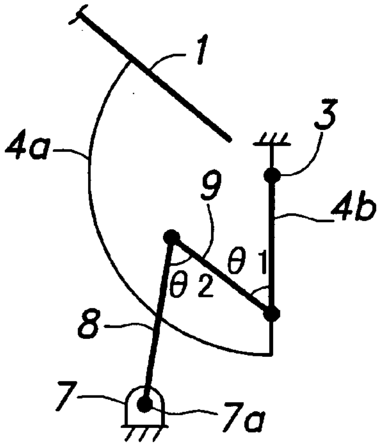
FIG. 9*c* is a view similar to FIG. 9*a* when the opening angle of the trunk lid is 90 degrees.
Figure 9D:
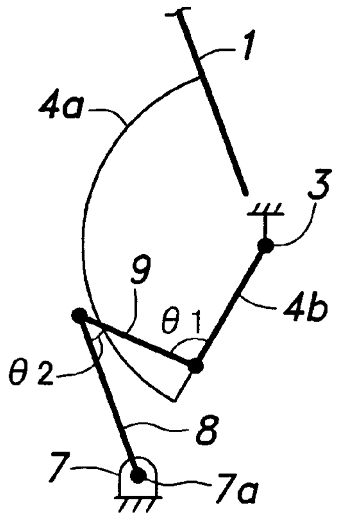
FIG. 9*d* is a view similar to FIG. 9*a* in the fully open state of the trunk lid.

The firs link 8 of the second embodiment pulls the second link 9 when opening the trunk lid 1 whereas the first link 8 of the first embodiment pushed the second link 9 under the same situation, and the second embodiment is otherwise similar to the first embodiment. FIG. 9*a* shows the fully closed state of the trunk lid 1 in which the first angle θ1 defined between the radial arm 4*b* and the second link 9 is 43 degrees and the angle θ2 defined between the first link 8 and second link 9 is at the maximum angle of 132 degrees. FIG. 9*b* shows the state where the trunk lid 1 has opened by an angle of 15 degrees, and both the angles are at their minimum values which are 41 degrees for θ1 and 105 degrees for θ2. FIG. 9*c* shows the state where the trunk lid 1 has opened by an angle of 50 degrees, and the angles θ1 and θ2 are 63 degrees and 53 degrees, respectively. FIG. 9*d* shows the fully open (substantially upright) state of the trunk lid 1 and the first angle θ1 is at the maximum angle of 97 degrees and the second angle θ2 is at the minimum angle of 48 degrees.

Thus, in the second embodiment, similarly as the first embodiment, the first link 8 is adapted to extend substantially from the output shaft 7*a* towards the closure member 1 as the first link 8 swing around the output shaft 7*a*. This direction from the output shaft 7*a* toward the closure member 1 is indicated in FIG. 5*b* by L. This direction L may extend substantially perpendicularly to the major plane of the closure member near the hinge end thereof.

Figure 10A:
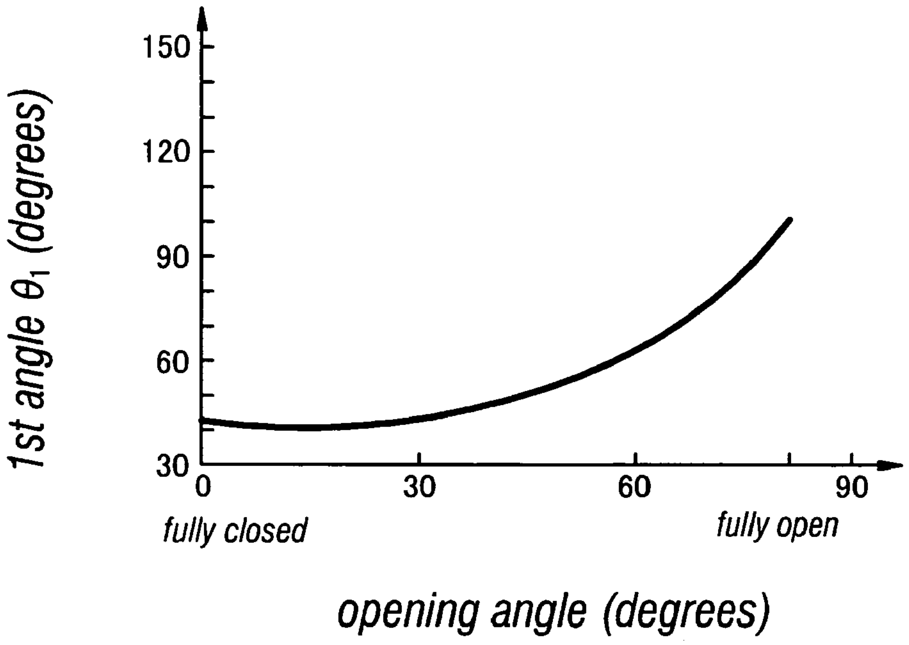
FIG. 10*a* is a graph showing the change in the first angle θ1 in relation with the opening angle of the trunk lid for the second embodiment of the present invention.
Figure 10B:
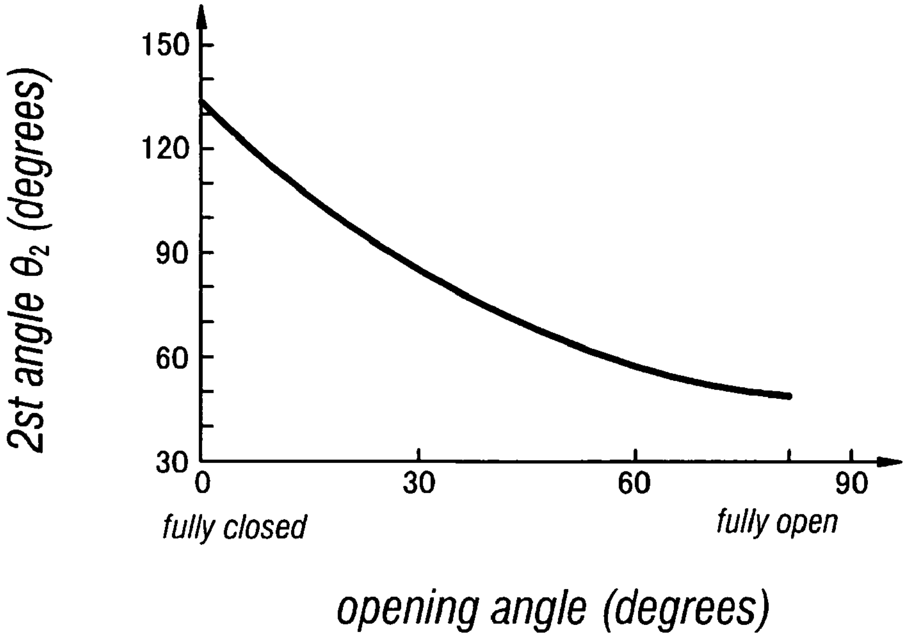
FIG. 10*b* is a graph showing the change in the second angle θ2 in relation with the opening angle of the trunk lid for the second embodiment of the present invention.

FIG. 10*a* shows the change in the first angle θ1 in relation with the opening angle of the trunk lid 1, and FIG. 10*b* shows the change in the second angle θ2 in relation with the opening angle of the trunk lid 1. As can be seen from these graphs, these angles θ1 and θ2 remain within the range of 30 to 150 degrees which keeps the link efficiency within an acceptable range. Because the push and pull relationship is reversed in relation with the previous embodiment, the relationships of the angles θ1 and θ2 in relation with the opening angle of the trunk are reversed with respect to those of the previous embodiment.

Figure 11:
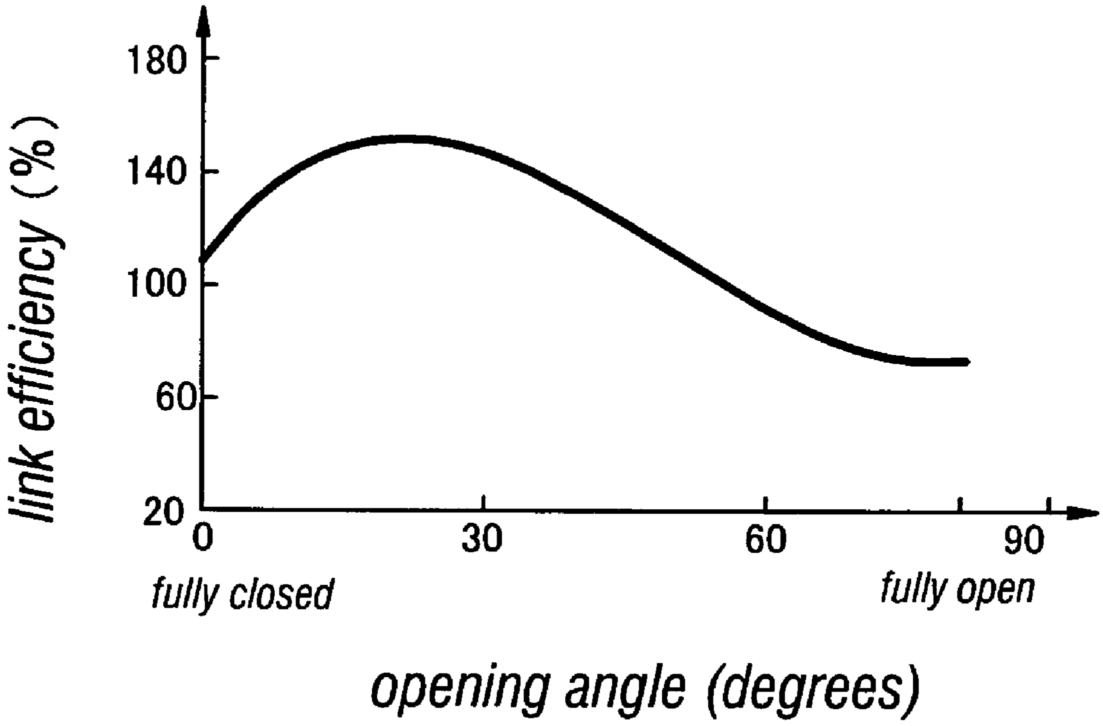
FIG. 11 is a graph showing the change in the link efficiency in relation with the opening angle of the trunk lid for the second embodiment of the present invention.

FIG. 11 shows the changes in the link efficiency in relation with the opening angle of the trunk lid 1. The rise and fall of the link efficiency are reversed from those of the previous embodiment. However, it still remains true that a high torque is available when the trunk lid is near the fully closed position and involves a relatively large load owing to its horizontal position, and the trunk lid 1 is moved at high speed as the trunk lid opens further from a partly open state and involves a progressively diminishing load owing to the more upright position of the trunk lid and the declining thrust of the damper 6.

In the second embodiment also, the first link 8 fixedly attached to the output shaft 7*a* of the actuator 7 swings around an upright position thereof (like an inverted pendulum) and moves in the opposite direction to the trunk lid as the trunk lid opens and closes. Thereby, this embodiment also provides advantages similar to those of the previous embodiment. If the same design specifications as those of the first embodiment are applied to the second embodiment except for the push and pull relationship of the first and second links 8 and 9, the second embodiment provides a generally favorable link efficiency. In particular, the second embodiment involves a relatively high speed and a relatively small torque near the fully closed and fully open positions.

By selecting one of the two possible embodiments depending on the particular geometry of the trunk space, it is possible to adapt the present invention to a wide range of configurations of the trunk space.

Although the present invention has been described in terms of preferred embodiments thereof, it is obvious to a person skilled in the art that various alterations and modifications are possible without departing from the scope of the present invention which is set forth in the appended claims. For instance, the illustrated embodiment are directed to trunk lids which take a substantially horizontal position in the fully closed state and open toward an upright position, but the present invention can also be applied to closures members which are not limited to trunk lids and disposed in different orientations in the fully closed and fully open positions although the geometry of the links may be slightly modified so as to optimize the link efficiency in each particular case. The contents of the original Japanese patent application on which the Paris Convention priority claim is made for the present application are incorporated in this application by reference.

The invention claimed is:

1. An actuator system for actuating a closure member mounted on a vehicle body via a hinge, comprising:

a hinge arm fixedly attached to the closure member at one end and pivotally attached to the vehicle body at a hinge point;

a power actuator mounted on the vehicle body and having an output shaft extending substantially in parallel with a pivot axis of the hinge;

a first link having a base end fixedly attached to the output shaft;

a second link having a base end pivotally connected to a free end of the first link and a free end pivotally attached to the hinge arm; wherein, the first link being adapted to extend substantially from the output shaft towards the closure member as the first link swings around the output shaft; and the second link is disposed in such a manner that the closure member turns in an opposite direction from a rotational direction of the output shaft.

2. An actuator system for actuating a closure member mounted on a vehicle body via a hinge, comprising:

a hinge arm fixedly attached to the closure member at one end and pivotally attached to the vehicle body at a hinge point;

a power actuator mounted on the vehicle body and having an output shaft extending substantially in parallel with a pivot axis of the hinge;

a first link having a base end fixedly attached to the output shaft;

a second link having a base end pivotally connected to a free end of the first link and a free end pivotally attached to the hinge arm; wherein the first link being adapted to extend substantially from the output shaft towards the closure member as the first link swings around the output shaft; and the second link is disposed in such a manner that the second link extends substantially perpendicularly to a line extending from the output shaft toward the closure member and that the closure member turns in an opposite direction from a rotational direction of the output shaft.

3. An actuator system for actuating a closure member according to claim 1, wherein a first angle defined between the second link and the hinge arm is smaller than 180 degrees and a second angle defined between the first link and second link is smaller than 180 degrees, and the first and second angles change in mutually opposite senses as the output shaft turns in each direction.

4. An actuator system for actuating a closure member according to claim 3, wherein the first angle and second angles are each in a range of 30 to 150 degrees.

5. An actuator system for actuating a closure member mounted on a vehicle body via a hinge, comprising:

a hinge arm fixedly attached to the closure member at one end and pivotally attached to the vehicle body at a hinge point;

a power actuator mounted on the vehicle body and having an output shaft extending substantially in parallel with a pivot axis of the hinge;

a first link having a base end fixedly attached to the output shaft;

a second link having a base end pivotally connected to a free end of the first link and a free end pivotally attached to the hinge arm; wherein the first link being adapted to extend substantially from the output shaft towards the closure member as the first link swings around the output shaft; and the second link is disposed in such a manner that a movement of the free end of the first link is transmitted to the hinge arm via a tensile force applied to the second link.

6. An actuator system for actuating a closure member according to claim 1, wherein the second link is disposed in such a manner that a movement of the free end of the first link is transmitted to the hinge arm via a compressive force applied to the second link.

7. An actuator system for actuating a closure member according to claim 1, wherein the output shaft of the power actuator is placed adjacent to a hinge end of the closure member.

8. An actuator system for actuating a closure member according to claim 1, wherein a major plane of the closure member near the hinge end thereof extends substantially perpendicularly to a line extending from the output shaft toward the closure member.

9. An actuator system for actuating a closure member according to claim 1, wherein the hinge arm includes an arcuate portion having a first end fixedly attached to the closure member and a radial arm extending from the other end of the arcuate portion toward the closure member.

10. An actuator system for actuating a closure member according to claim 9, wherein a part of the closure member adjacent to the hinge extends substantially horizontally.

11. An actuator system for actuating a closure member according to claim 1, wherein the closure member comprises a trunk lid of an automobile.

12. An actuator system for actuating a closure member according to claim 1, further comprising a damper that normally urges the closure member toward the fully open state.

13. An actuator system for actuating a closure member according to claim 1, wherein the second link is arcuate.

14. An actuator system for actuating a closure member according to claim 1, wherein the output shaft is disposed at a lower level than the free end of the first link.

15. An actuator system for actuating a closure member according to claim 1, wherein the free end of the first link extends upwardly substantially from the output shaft towards the closure member when the closure member is an open position thereof.

16. An actuator system for actuating a closure member according to claim 1, wherein the free end of the first link extends upwardly substantially from the output shaft towards the closure member as the first link swings around the output shaft.

17. An actuator system for actuating a closure member according to claim 2, wherein the second link is arcuate.

18. An actuator system for actuating a closure member according to claim 5, wherein the second link is arcuate.

* * * * *